United States Patent
Day

[19]

[11] Patent Number: 5,850,428
[45] Date of Patent: Dec. 15, 1998

[54] MESSAGE MANAGEMENT SYSTEM AND METHOD

[76] Inventor: Robert Allen Day, 706 Massachusetts #205, Indianapolis, Ind. 46204

[21] Appl. No.: 682,146

[22] Filed: Jul. 17, 1996

[51] Int. Cl.$^6$ ..................................................... H04M 1/64
[52] U.S. Cl. ................................ 379/88; 379/70; 379/214
[58] Field of Search .................................. 379/67, 88, 89, 379/69, 70, 214

[56] References Cited

U.S. PATENT DOCUMENTS

| | | |
|---|---|---|
| 4,580,012 | 4/1986 | Matthews et al. . |
| 4,602,129 | 7/1986 | Matthews et al. ......................... 379/67 |
| 4,625,081 | 11/1986 | Lotito et al. ............................... 379/67 |
| 4,939,771 | 7/1990 | Brown et al. .............................. 379/67 |
| 4,975,945 | 12/1990 | Carbullido . |
| 5,014,298 | 5/1991 | Katz . |
| 5,016,270 | 5/1991 | Katz . |
| 5,073,929 | 12/1991 | Katz . |
| 5,163,000 | 11/1992 | Rogers et al. . |
| 5,170,426 | 12/1992 | D'Alessio et al. . |
| 5,224,153 | 6/1993 | Katz . |
| 5,283,731 | 2/1994 | Lalondo et al. . |
| 5,355,406 | 10/1994 | Chencinski et al. ....................... 379/88 |
| 5,359,645 | 10/1994 | Katz . |
| 5,371,787 | 12/1994 | Hamilton ................................. 379/216 |
| 5,383,113 | 1/1995 | Kight et al. . |
| 5,581,602 | 12/1996 | Szlam et al. ............................. 379/265 |

OTHER PUBLICATIONS

Oak Tree Communications L.L.C. Brochure (no date).
Service Audio Response System Overview, copyright 1994.
Harry Newton & Rick Luhmann, Computer Telephony, Send Us Your Pre–1989 Brochures, Oct. 1996.
CaSI Condensed Users Guide, CSCUG4.3–1, Advanced Voice Technologies, Inc., May 8, 1989.
Voice Messaging=New AT&T Software Package, Edge, Apr. 13, 1992.
CaSI Product Description, P2–4, 1986.
Quick Reference, P2–7, 1986.

*Primary Examiner*—Fan S. Tsang
*Attorney, Agent, or Firm*—Woodard, Emhardt, Naughton, Moriarty & McNett

[57] ABSTRACT

An automated message handling system and method particularly useful to efficiently exchange information between repair shops and customers waiting on items to be repaired is disclosed. The system includes a computer connected to the telephone system. A Service associate calls the system to leave voice messages for a selected customer. A Customer may access the system to listen to a message left by a service associate. Also, the system may be configured to automatically notify the customer of a pending message and may solicit a response. The access to customer messages is controlled by assignment of a code for each customer.

18 Claims, 8 Drawing Sheets

MESSAGE MANAGEMENT SYSTEM AND METHOD

BACKGROUND OF THE INVENTION

The present invention relates to processes and equipment for communications between service providers and their customers, and more particularly, but not exclusively, relates to a voice interactive telephone message management system to improve the efficiency of information exchange between automobile repair businesses and their customers.

It is common for a customer to drop off an item at a business for inspection, maintenance, or repair, and then periodically telephone the business to learn the status of the operation. This practice is quite common when the item is an automobile left for repair. Unfortunately, customers often become dissatisfied when their calls are not received or are not returned directly by someone who is knowledgeable about the particular service being performed.

A related communication problem arises when information must be provided to the customer during the course of the repair or other service, and a response received before completing the operation. One example of this situation is when the business provides an estimate of the cost of an automobile repair and must await customer approval before proceeding. Indeed, delays in delivering the estimate and receiving the approval may be quite costly—especially when an automobile undergoing repair has been disassembled in a service bay to provide the estimate and cannot be readily moved while awaiting word from the owner. Similar problems can arise when other items, such as computers, audio-video equipment, and recreational vehicles are left for repair.

One approach to these problems is to have the person repairing the item communicate with the customer directly, but this strategy often adversely impacts efficiency of the business. Another approach is to hire additional staff to facilitate communications with customers; however, hiring more personnel may also degrade efficiency. Although answering machines may ease the communication burden to some extent, an undesirable delay in responding to an inquiry still frequently results.

Thus, there remains a need for a system and method to coordinate the prompt and efficient exchange of information between businesses performing work on drop-off items and their customers. This need is particularly acute in the area of automobile repair. In fact, it would be preferred to implement a system which not only improves communications, but also has the capability to promote future business.

SUMMARY OF THE INVENTION

One feature of the present invention is a system and method to more efficiently transmit information between a service provider, such as an automobile repair business, and their customers by telephone.

In another feature of the present invention, a number of items are serviced which each belong to a different customer. A code is identified that corresponds to each customer, and a voice message is stored for a selected customer. This message is provided to the selected customer through the telephone system when the code corresponding to the selected customer is supplied. The message of the selected customer may be stored by a service associate or representative through the telephone system. In one embodiment of this feature, the message is automatically transmitted to the customer with appropriate notification. In another embodiment of this feature, the message is accessed by a customer who calls in and supplies the code.

In another feature of the present invention, a message management system includes a computer configured for interfacing with a telephone system. The computer stores a number of data records each having a code corresponding to a different customer. The computer is configured to transmit a voice message through the telephone system designated for a selected customer in response to a signal. The signal is representative of a selected code corresponding to a data record for the selected customer.

Still another feature of the present invention includes a computer readable medium having a program configured for execution by a computer operatively coupled to a telephone system. The program configures the computer to store a number of customer data records each having a code corresponding to a different customer. The program also configures the computer to transmit a voice message designated for a selected customer through the telephone system. The message is transmitted in response to transmission of a selected code through the telephone system. The selected code is determined from a selected one of the data records which corresponds to the selected customer.

Accordingly, it is one object of the present invention to provide a system and method for managing messages between service providers and their customers.

Another object of the present invention is to provide a computer system coupled to a telephone system to facilitate efficient transmission of voice messages.

Still another object is to provide a computer program to manage communications between a business and their customers who leave one or more items at the business for servicing.

Further objects, features, and advantages of the present invention shall become apparent from the detailed drawings and descriptions provided herein.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended. Any alterations and further modifications in the described device, and any further applications of the principles of the invention as described herein are contemplated as would normally occur to one skilled in the art to which the invention relates.

Figure 1:
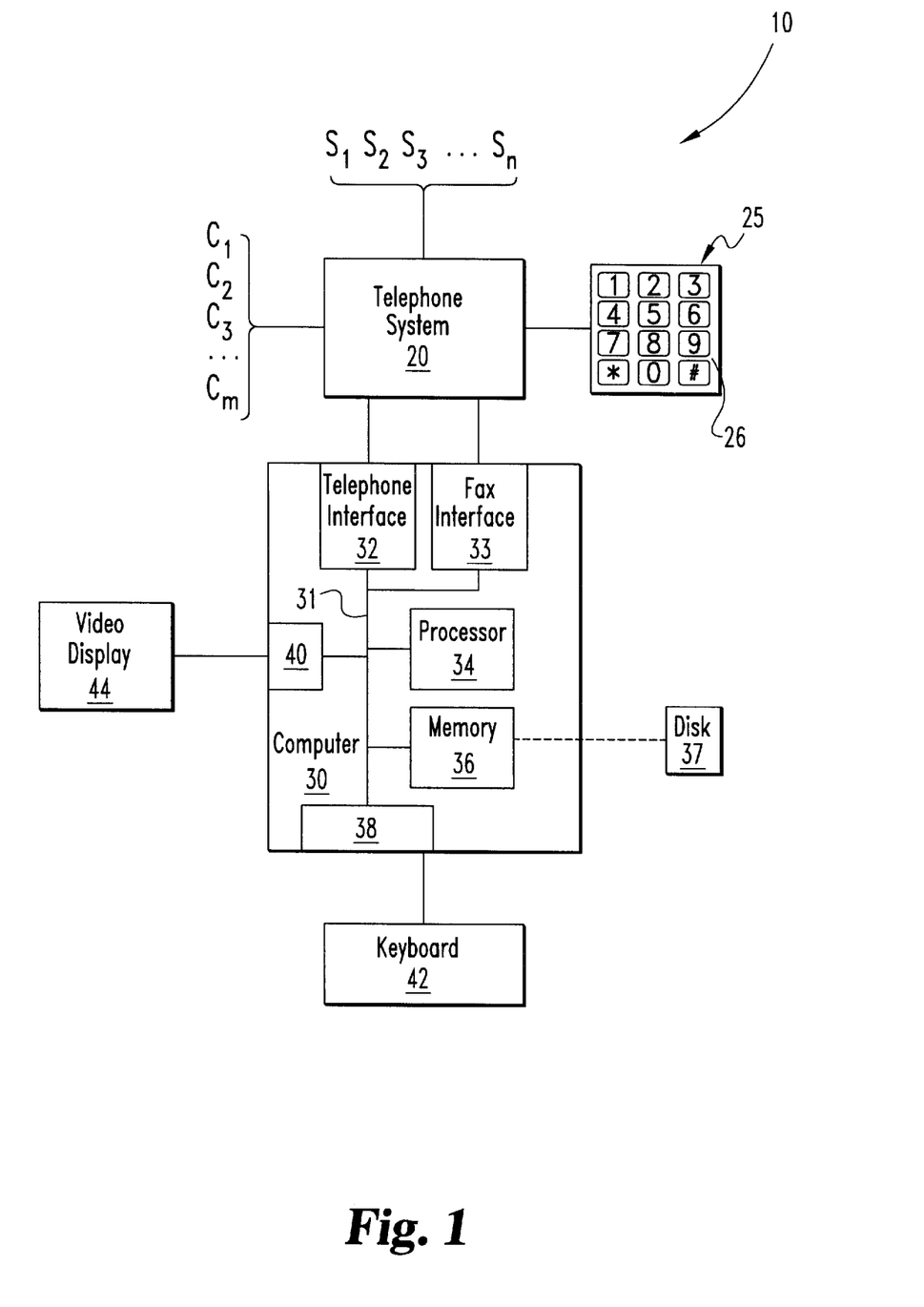
FIG. 1 is a diagrammatic view of a message system of one embodiment of the present embodiment.

FIG. 1 illustrates a message management system 10 of the present invention. Generally, system 10 provides automated management of two-way messages between customers $C_1$, $C_2$, $C_3$, ..., $C_m$ of a business and service associates or representatives $S_1$, $S_2$, $S_3$, ..., $S_n$ of the business; where m and n represent the number of customers and service associates, respectively, expected to utilize system 10. System 10 includes the interface of telephone system 20 to computer 30. Telephone system 20 may be an external or public telephone network, an internal office telephone network, or a combination of both. Generally, customers access telephone system 20 through a telephone network external to the business and service associates access telephone system 20 through an internal phone network. A representative keypad 26 for a typical telephone 25 of system 20 is illustrated in FIG. 1.

Telephone system 20 is operatively coupled to computer 30 by at least one communication channel. Preferably, dedicated telephone lines are input to computer 30 in a quantity "q" sufficient to manage the expected number of calls as a function of predicted m and n values. Computer 30 has bus 31 interconnecting telephone line interface 32, telefacsimilie (fax) interface 33, processor 34, memory 36, keyboard interface 38, and video display interface 40. Keyboard interface 38 is operatively coupled to keyboard 42, and video display interface 40 is operatively coupled to display monitor 44. Preferably, keyboard 42 and monitor 44 are used to monitor performance of system 10 and provide a means to update programming.

Computer system 30 is adapted for use to handle routine communications with customers. Computer 30 detects inbound telephone calls to a main telephone number given to customers of the business. This main access number is also utilized by service associates of the business desiring access to system 10. Computer 30 provides for the storage of voice messages which may be automatically sent to one or more designated telephone numbers or accessed by designated parties at a later time from a remote location.

Computer 30 may be a collection of one or more electronic components or a single custom integrated component. For example, computer 30 may include digital circuits, analog circuits, fuzzy logic circuits, or a combination of these circuit types. Computer 30 may be programmable by software or firmware or be "hard-wired" as a state machine, or employ a combination of these techniques. However, it is preferred that computer 30 be a programmable personal computer with various software and hardware customized to practice the present invention. This preferred configuration may include communication links to other I/O devices (not shown) such as a printer, loud speaker, microphone, mouse, modem, computer network, or other types of I/O devices as would occur to one skilled in the art. It is also preferred that processor 34 be a microprocessor of conventional configuration. Nonetheless, in other embodiments, computer 30 may be arranged differently to provide the desired functionality.

Interface 32 functionally interconnects computer 30 to telephone system 20. Interface 32 includes an Analog to Digital (A/D) converter to convert incoming sound from an analog format into a digital format for storage in memory 36. Preferably, memory 36 includes a magnetic hard disk for this purpose. Also, interface 32 includes a Digital to Analog (D/A) converter for communicating stored digital sounds over an analog line during an outbound communication of telephone system 20. For embodiments that include a digital communication line connection directly to computer 30, the A/D and D/A conversion may not be necessary. The physical size of interface 32 and manner of interconnection to computer 30 may vary with the number of lines q. Computer 30 is preferably configured so that processor 34 executes a software program to control operation of interface 32 and data exchange therewith. Interface 32 is also configured to provide control signals in response to the tones generated by pressing keys of a telephone keypad configured in the tone mode. Interface 32 and computer 30 cooperate to identify the unique tones associated with the depression of each key on a telephone keypad configured in the tone dial mode, such as keypad 26 of phone 25. An algorithm executed by computer 30 may be configured to respond to one or more detected keys (tones) to perform a corresponding process. These keypad commands may be configured as a user menu to select various process options in response to corresponding verbal prompts over the telephone. In an alternative embodiment, a voice recognition algorithm is used to provide logic inputs to computer 30 from system 20 either alone or in combination with telephone keypad input. In still other embodiments, another device such as keyboard 42 may be used to provide input to system 10 as appropriate.

Fax interface 33 provides for telefax communications over telephone system 20. Preferably, at least one separate, dedicated telephone line from system 20 is provided for fax communications with computer 30 via interface 33.

Memory 36 may include electronic (e.g. solid state), magnetic, or optical memory components, or a combination of these varieties. Memory 36 is depicted with removable memory disk 37 as indicated by the dashed connection. Preferably, memory disk 37 is of the optical or magnetic variety. In other embodiments of the present invention, disk 37 is not present or a different type of computer readable removable medium is used. Memory 36, 37 may be integrally associated with system 10, or may be remotely accessed via a communication link with system 10, such as a modem or digital computer communication network.

Figure 2:
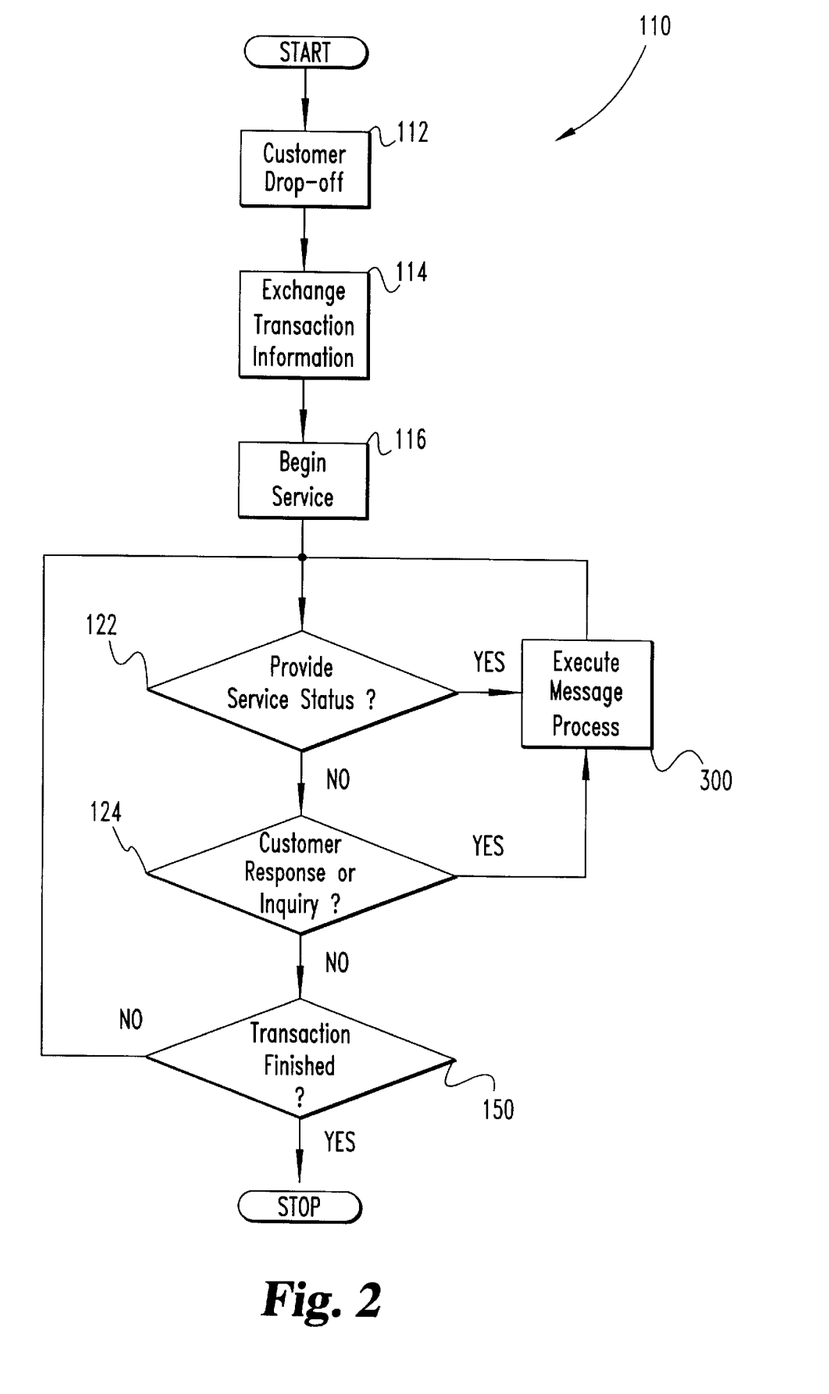
FIG. 2 is a flow diagram depicting one process utilizing the message system of FIG. 1.

FIG. 2 depicts a flow diagram of one process 110 utilizing system 10. Process 110 starts in stage 112 with a customer dropping off an item to be serviced, this item may be an automobile being left for repair at an automobile repair business. After stage 112, information is exchanged with the customer for the given service transaction in stage 114. Stage 114 data generally includes creation of a claim check for the item to be serviced. The information collected includes the customer's name and all telephone numbers which the customer is willing to provide, such as residential, business, mobile, paging, telefax, and answering service telephone numbers. Stage 114 also includes instructing the customer about certain features of system 10 and providing the customer a Customer Number (CN) used to access system 10. A CN functions as an access key or code which corresponds to the customer and any items being serviced for the customer. Next, the service to the item begins in stage 116. For automobiles, this is typically a lengthy repair which may take several days to complete. Often, customers are anxious to learn of progress being made and may want an estimate of expected costs before authorizing some or all of the service.

As the service progresses, the service associate decides whether to leave a voice message for the customer in conditional 122. If conditional 122 is true, then message process 300 is executed. This message may include a request for a customer response. The initial entry of data for a customer is prompted the first time a message is left for the customer. If an update/initiation is not needed (conditional 122 is false), then control flows from conditional 122 to conditional 124.

In conditional 124, if a customer calls in response to a message delivered by system 10 or to learn about service progress, then message process 300 is once again executed. Otherwise, conditional 150 is encountered. Once the service transaction is finished, then the process stops as reflected in conditional 150. If the service transaction is still active, then control loops back to conditional 122.

Figure 3:
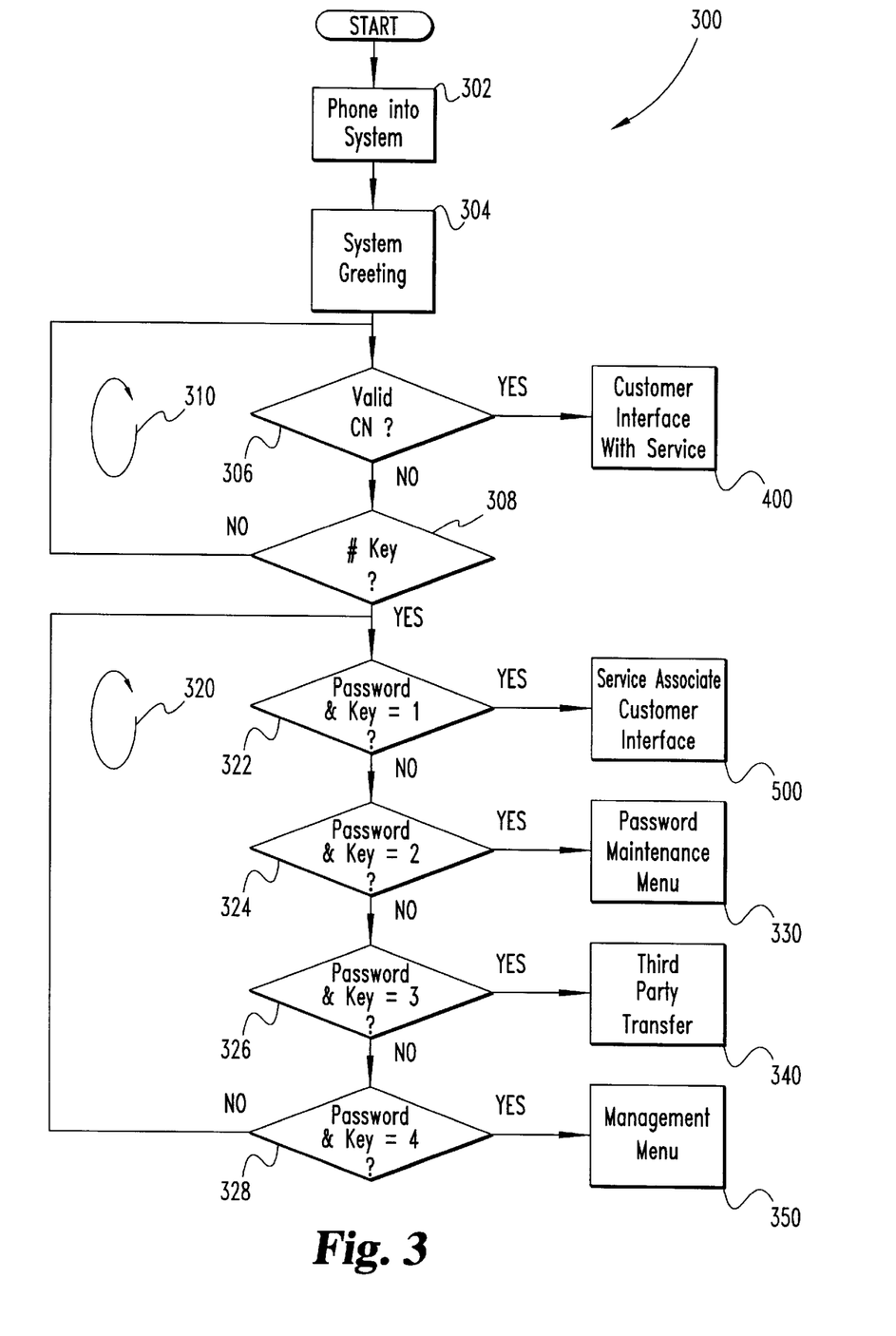
FIG. 3 is a flow diagram detailing certain aspects of the process for managing messages illustrated in in FIG. 2.

FIG. 3 depicts certain aspects of message process 300 in greater detail. Access to message process 300 begins by calling the main telephone number for system 10 in stage 302. Next, the caller is verbally greeted in stage 304. Preferably, process 300 is implemented in software executed by computer 30. It is also preferred that this software reside in memory 36. This software is configured so that a caller may interface with system 10 by listening to a vocal selection menu generated by computer 30 over the telephone and respond by pressing one or more telephone keypad buttons to select one of the various options offered. The voice messages, vocal greeting, selection menu and various verbal prompts provided by system 10 over the phone may be generated from one or more of a variety of sources such as preprogrammed or "embedded" words or phrases stored in either a digital or analog format, a voice synthesis chip, or a digital recording obtained over telephone system 20 using the aforementioned A/D and D/A capability of interface 32.

The greeting of stage 304 assumes the caller is a customer and directs the customer to enter their Customer Number (CN) which should have been provided when the item was brought in for service (see stage 114 of FIG. 2). Preferably, stage 304, and the other data input prompts of process 300 permit the caller to press zero ("0") for help. When "0" is pressed, verbal instructions are provided over the phone to the caller which are pertinent to the particular options available to the caller at the given stage of process 300. Also, it is preferred that the various stages of process 300 which offer the caller an option include the option of backing-up to the most recently executed option by pressing the star ("*") key. However, because stage 304 is the first stage of process 300 instructing the caller to take action, the * key back-up option is not generally offered at this stage. Nonetheless, it is preferred that the greeting message of stage 304 be repeated periodically until the caller takes action.

Figure 4A:
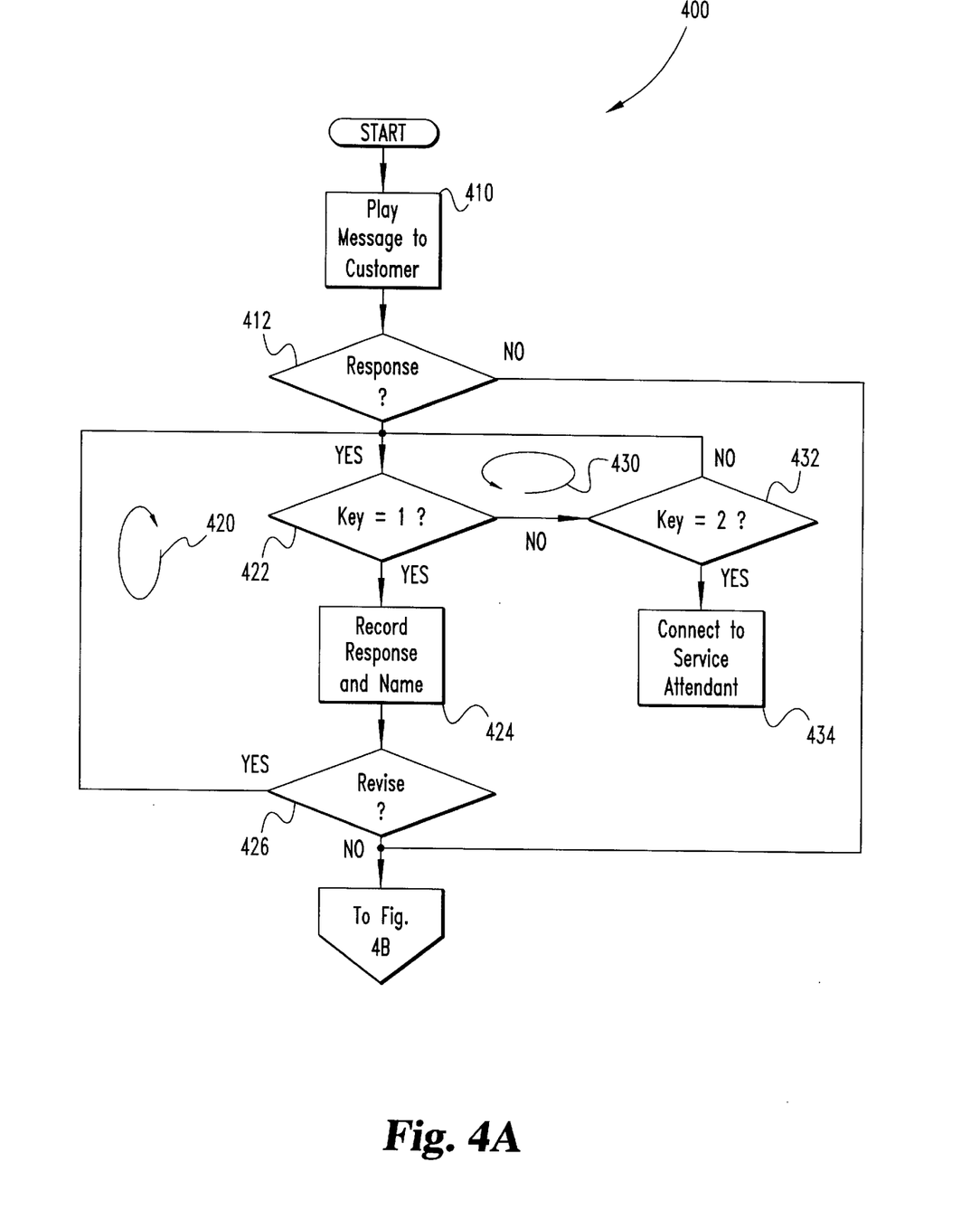
FIGS. 4A and 4B collectively depict a flow diagram detailing certain customer interface aspects of the message managing process illustrated in FIG. 3.
Figure 4B:
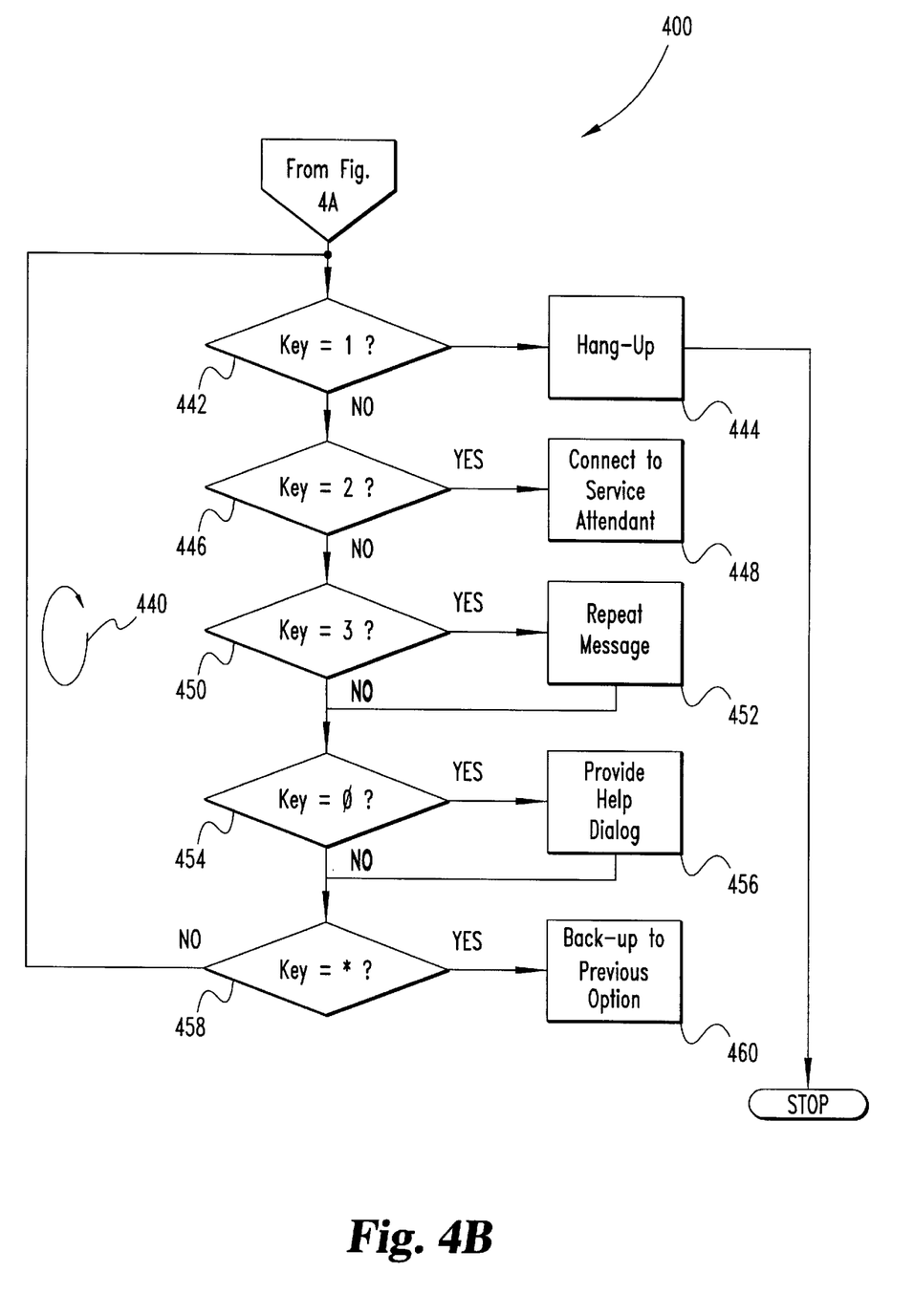

The typical action a customer will take upon hearing the greeting and instructions of stage 304 is to enter the assigned CN. Preferably, each CN is at a four digit number that may be entered into system 10 over a telephone of system 20 by sequentially selecting at least four corresponding telephone keypad buttons. The entry of a valid CN is tested in conditional 306. Upon entry of a valid CN, a data record for that CN is accessed and further processing takes place in customer interface 400 of process 300. Referring to FIGS. 4A and 4B, stage 410 of interface 400 provides the most recent message left for the customer by a service associate. Preferably, at least a portion of the messages provided to customers over system 20 include a digital recording made by the service associate. This recording is provided by converting it to an analog form from a digital form residing in in memory 36. Interface 32 facilitates transmission of this message from computer 30 to telephone system 20.

Conditional 412 is next encountered which tests whether the service associate leaving the message has requested the customer to respond. If a customer response has been flagged, then control flows to menu loop 430. Menu loop 430 corresponds to verbal prompts to select key no. 1 to respond to the message of stage 410 or key no. 2 to be connected to the business switchboard. Other options preferably include selecting key no. 3 to have the message repeated, key no. 0 for verbal on-line help, and the * key to back-up to a previous option. Furthermore, the caller can terminate process 300 by hanging-up the telephone at anytime.

Conditional 422 of loop 420 tests whether the no. 1 key has been pressed. If key no. 1 has been pressed, then control flows to response loop 420, beginning with stage 424 which stores the customer's response to the message. By way of non-limiting example, this response may be a general voice instruction to the service agent, a confirmation of receipt of the message, or an approval of an estimate. Preferably, software for process 300 is configured to verbally instruct the the customer over the phone that only a limited amount of message time is available as appropriate in an effort to conserve space in memory 36. In addition, the customer is asked to record their name in response to selected types of messages, such as estimate approvals.

Once the customer response is recorded, then the customer is offered the option of whether to revise the message in conditional 426. This option may include the option of listening to the recently recorded message. If the customer decides to revise the message, then control flows around response loop 420 back to conditional 422. The customer's response is stored digitally in the same manner as the service associate message with system 10. The service associate may play back the customer's response over the phone through another interface with process 300 discussed in connection with FIGS. 5A and 5B.

In menu loop 430, if key no. 1 has not been pressed, then conditional 432 is encountered which tests whether key no. 2 has been pressed. Keys 1 and 2 correspond to verbal options presented to the customer over the phone. If it has, then the customer is connected with the switchboard for the business using system 10 in stage 434. In effect, stage 434 may include the termination of process 300 or the customer may be offered the option of re-entering process 300 after communicating with an attendant. If key no. 2 is not pressed control flows around loop 430 back to conditional 422 to test for key no. 1 once again.

When a response has been provided via menu loop 420 and revision is not desired, or when a response is not required for the message provided in stage 410, then control flows to menu loop 440 of FIG. 4B. Menu loop 440 corresponds to a verbal menu concerning options associated with telephone keypad keys 1, 2, 3, 0, and "*" as indicated. Conditional 442 tests whether key no. 1 has been pressed, in which case process 300 is terminated in stage 444 by hanging-up. Conditional 446 tests whether to connect to a service associate or other attendant via an internal switchboard of the business using system 10 by determining if key no. 2 has been pressed. If key no. 2 has been pressed, then control flows to stage 448 to connect to the attendant. Conditional 446 and stage 448 are generally the same as conditional 432 and stage 434 depicted in loop 430 of FIG. 4A. Similarly, the attendant may have the option of re-connecting the customer to system 10 at a selected point in process 300. Alternatively, the customer may hang-up, effectively terminating process 300.

If neither conditional 442 or 446 are satisfied, then control flows to conditional 450 to test whether key no. 3 has been pressed. Key no. 3 corresponds to whether the customer desires to repeat the message of stage 410. If the customer selects key no. 3 then the message repeats in stage 452 before returning control to menu loop 440. Similarly, if the customer needs help during the process, key no. 0 may be pressed as tested in conditional 454. If conditional 454 is pressed, a help dialog is provided in stage 456, then control returns to loop 440. Next conditional 458 tests whether to back-up to the previous option or menu in stage 460 by detecting when the "*" key is pressed. If none of conditionals 442, 446, 450, 454, or 458 are satisfied, control returns via menu loop 440 from conditional 458 to conditional 442. The customer can also terminate process 300 by hanging-up without selecting an option.

Returning to FIG. 3, aspects of process 300 resulting when when conditional 306 of loop 310 is not satisfied are next described. When conditional 306 is not selected, conditional 308 is encountered which tests whether the "pound" key ("#") has been pressed. If it has, then the main service associate menu is provided. Thus, the # key provides a "secret door" into other features of process 300. Menu loop 320 of process 300 is entered when conditional 308 is satisfied. Menu loop 320 provides several options in the form of conditionals 322, 324, 326, 328 which each require the service associate to enter a password and keypad number. Preferably, key no. 0 is also offered (not shown) to provide pertinent verbal on-line help information to the service associate at each menu. In addition, it is preferred that the service associate have the option of pressing the * key to back-up to the previous menu for each stage of process 300 similar to a customer.

Conditional 322 of menu loop 320 tests whether a valid service associate password has been entered and whether key no. 1 has been pressed. If it has, then the service associate customer interface 500 is encountered. Process interface 500 is discussed further in connection with FIGS. 5A and 5B. If conditional 322 is not satisfied, then control flows to conditional 324.

Conditional 324 tests whether a valid password and key no. 2 have been entered. If key no. 2 has been pressed, then a verbal password maintenance menu is presented in stage 330. The conditionals for the password maintenance menu are not expressly shown in FIG. 3, but follow a similar procedure to the illustrated menu loops 320, 430 and 440. For example, stage 330 permits the service associate to listen to statistics concerning performance in connection with assigned CNs by pressing key no. 1. These statistics may include total number of messages played to customers and percentage of customers who listened to messages without connecting to the business to talk in person. Other statistics include the number of automated customer notifications performed by system 10 for the given password and the number of those notifications which were successful. Another possible statistic is the percentage of customers who have played service messages, and the number of CNs initialized under the given service associate password. Still other statistics might include the number of CNs created before the first customer call into system 10 and the percentage of CNs which have been completely processed—those which have been designated for re-use or "recycling."

After hearing these statistics, the service associate returns to the maintenance menu and may press key no. 2 to change the phone or fax numbers for system 10. Similarly, key no. 3 may be pressed to change a default message provided to the customers for the given password. Key no. 4 may be pressed to change the recorded name of the service associated under the given password. Key no. 5 may be pressed to change the business name. Key no. 6 may be pressed to change the spelling of the service associate number under the given password for transmission in a banner for a facsimile sent with system 10.

Returning to menu loop 320, if a valid service associate password and key no. 3 have been pressed, then a third party transfer is initiated in stage 340. Stage 340 is a tool for contacting third parties where the service associate expects to be on hold for an extended period of time. Stage 340 maintains the telephone communication connection during the lengthy hold period and then transfers the call to the service associates designated phone when the call is taken off hold. This feature is especially useful when contacting extended warranty companies concerning a given automobile repair.

A valid password and pressing key no. 4 enters a management menu in stage 350. Although no illustrated for clarity, the management menu performs similarly to the other verbal/keypad driven menus illustrated through menu loops 320, 430, 440. The password used to enter stage 350 is specially designated—other service associate passwords will be ineffective to enter stage 350. Once in the management menu, the caller can press key no. 1 to hear overall statistics collected by the system similar to the password specific statistics discussed in connection with the password maintenance menu of stage 330. Furthermore, by pressing key no. 2, statistics specific to a given recorded name of a service associate may be heard. By pressing key no. 3, statistics specific to a given service associates password may be aurally reviewed. Selection of keypad key no. 4 permits addition of a management password. Selection of key no. 5 facilitates addition of a service associate (non-management) password. Selection of key no. 6 provides for the deletion of a selected password. Selection of key no. 7 enters the service customer interface 500 yet to be described in connection with FIGS. 5A and 5B.

Figure 5A:
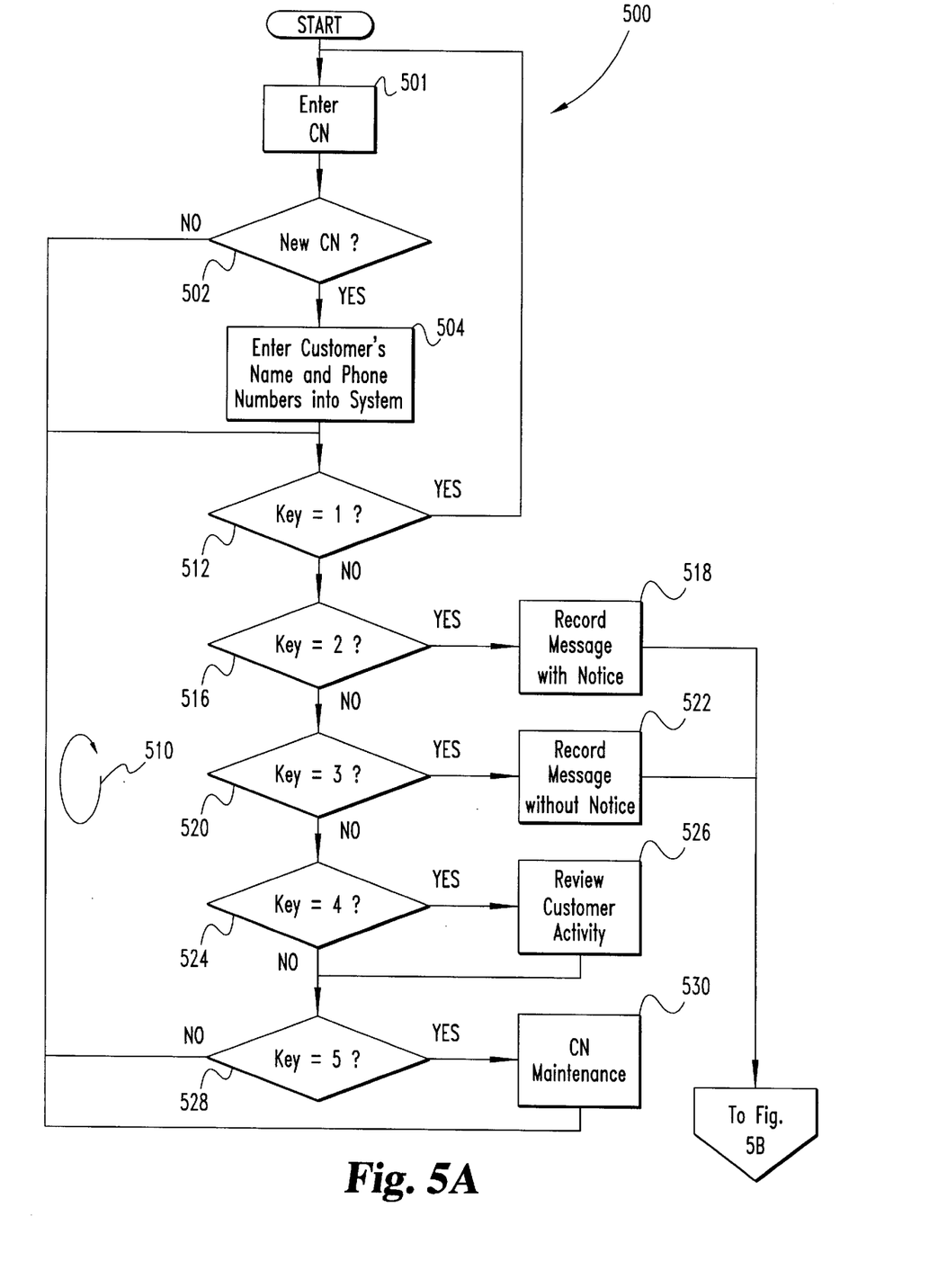
FIGS. 5A and 5B collectively depict a flow diagram detailing certain service business interface aspects of the message managing process illustrated in FIG. 3.
Figure 5B:
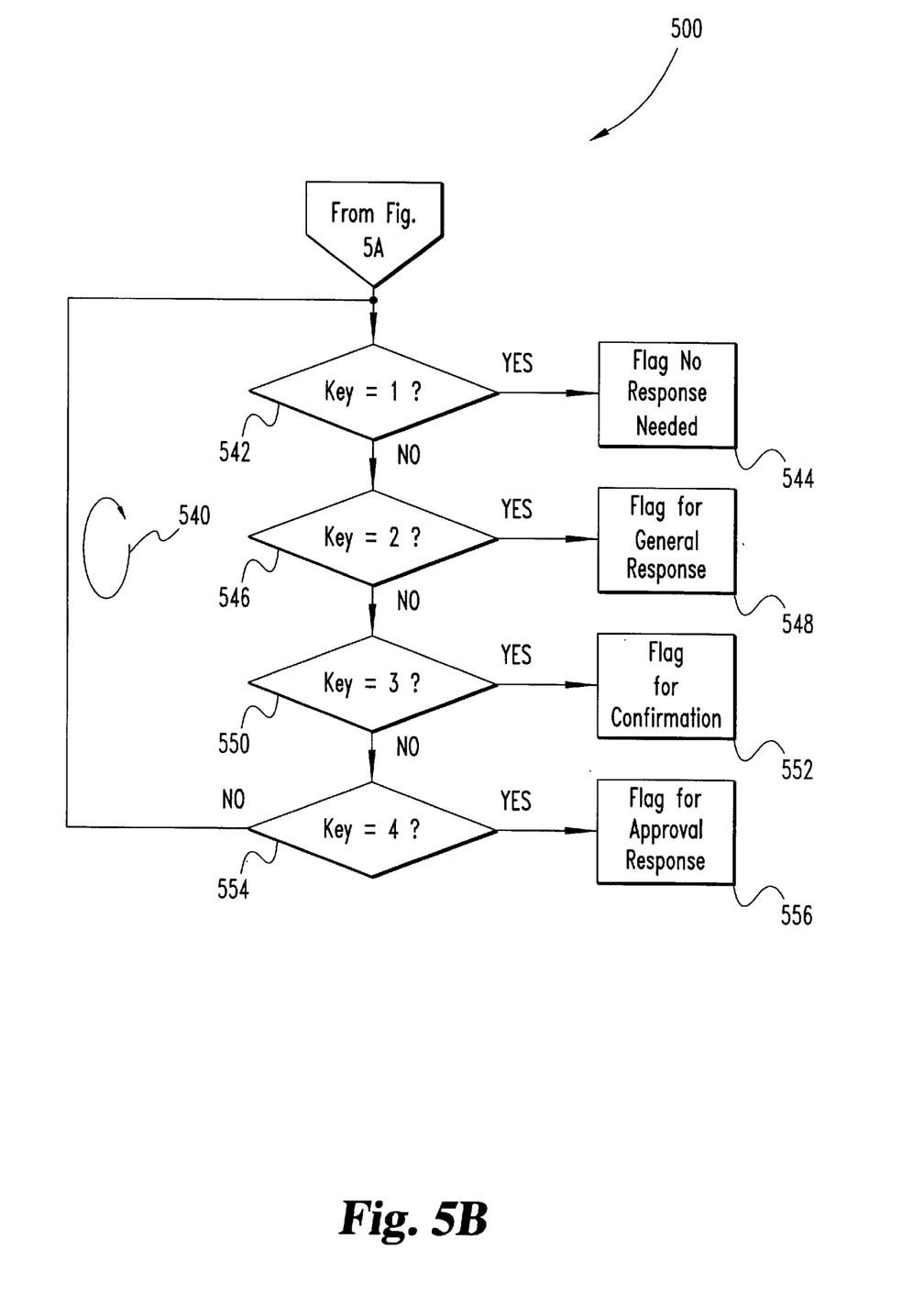

Referring to FIGS. 5A and 5B, service associate customer interface 500 is further detailed. In stage 501, a CN corresponding to the customer of interest is entered into system 10 via a telephone by a service associate. Next, conditional 502 of process interface 500 tests whether the CN is a new entry or not. If the CN is new, then control flows to stage 504 to set-up a customer data record for storage in memory 36. Preferably, this record includes the assigned CN, the customer's name and available telephone numbers with corresponding telephone types. The record may also include telefacsimilie phone numbers to provide telefax notifications to customers as appropriate with system 10 via interface 33. are entered into the record. Generally, it is preferred to create a new record for each coexisting customer transaction or item. Each of the records in existence has a unique CN. Messages to the customer are linked to the record by the corresponding CN or or may form a part of the record. In one alternative embodiment, the entry of information in stage 504 because it is obtained from a data base of another system. For example, a shop floor status computer may provide the relevant customer information in place of stage 504.

If conditional 502 is not satisfied, then stage 504 is skipped and menu loop 510 is encountered which has conditionals 512, 516, 520, 524, and 528 corresponding to the selection of telephone keypad keys 1, 2, 3, 4, and 5. Although not illustrated for clarity, it should be understood that it is preferred to utilize on-line help and option/menu back-up keys as well.

Conditional 512 corresponds to the option of changing to another CN. If conditional 512 is satisfied, then another CN may be entered in stage 501. If key no. 1 is not pressed, then control flows to conditional 516 to determine if key no. 2 has been pressed. Selecting key no. 2 corresponds to a prompt to the calling service associate to record a message for the customer whose CN was most recently entered in stage 501 and provide notification to that customer after the recording is complete. If key no. 2 has been pressed, then control flows to stage 518 to record a message from the service associate and notify the customer with the various voice, pager, answering service, and facsimile telephone numbers previously entered in stage 504. This selection is used to automatically notify the customer of some aspect of the service being provided. This notification may include a message recorded by the service associate, a predetermined or "canned" message selected by the service associate, or a combination of these approaches. Preferably, the message begins when a person answers the telephone and indicates the intended recipient of the message by name. The message may also offer a number of keypad driven options such as putting the message on hold while attempting to locate the intended recipient, forwarding the message to voice mail or an answering machine, or repeating the message. System 10 is also preferably configured to detect an answering machine or voice mail pick-up and take appropriate action. Consequently, this automated notification provides an effective message without requiring the service associate to spend valuable time trying to reach the customer. For example, the record message with notice option of stage 518 may be used to tell the customer that repairs to their car are complete and that it is available for pick-up.

Figure 6:
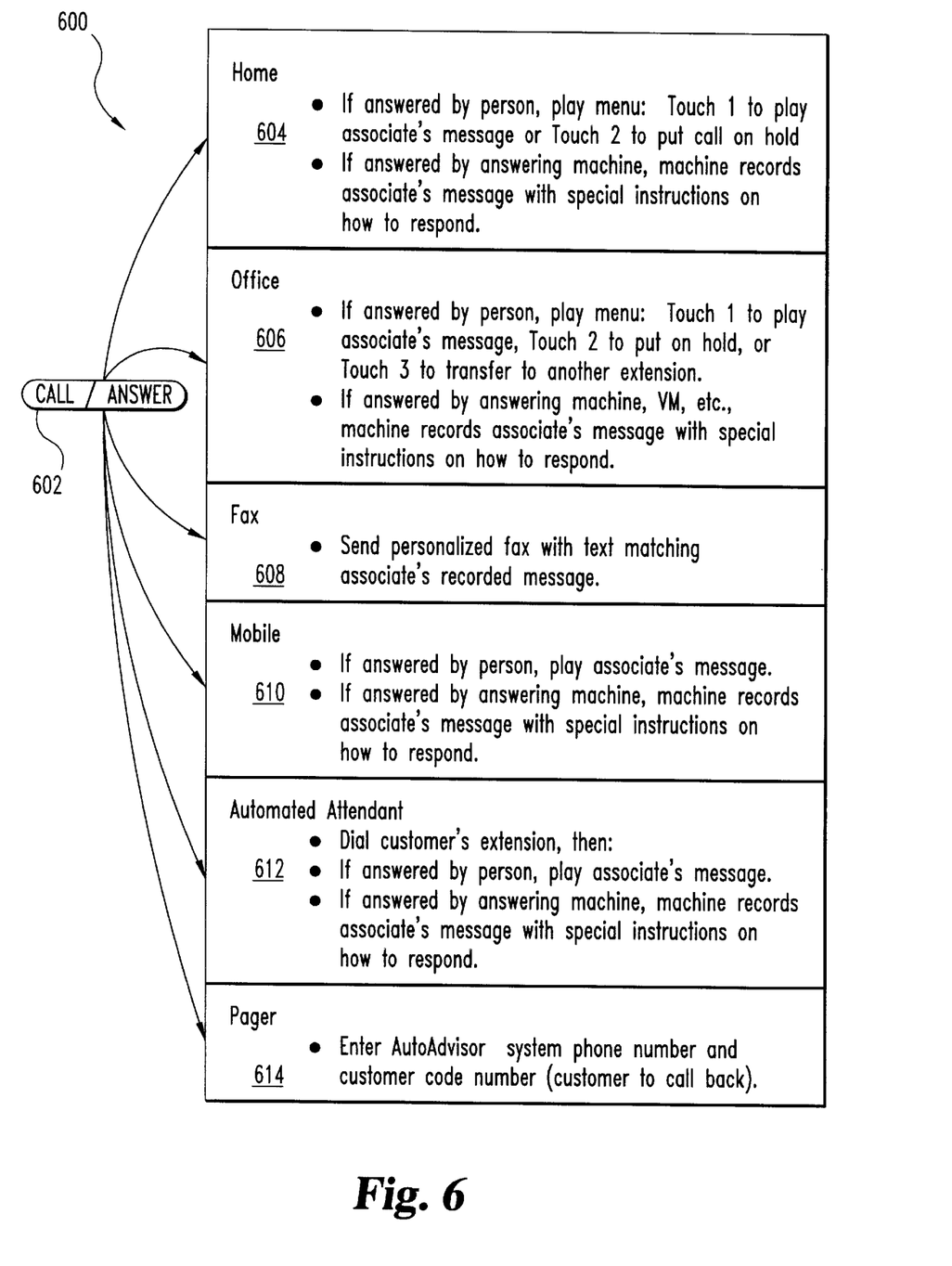
FIG. 6 is a diagram of certain aspects of the notification feature discussed in connection with FIGS. 5A and 5B.

FIG. 6 is a diagram of one embodiment of the notification subprocess 600 associated with stage 518. When an automated notification call to a customer is answered in stage 602, the handling of the call is described in terms of the type of telephone number called and the environment of the answering location. Block 604 reflects the options offered a residential recipient of the call or a residential answering machine. Similarly, block 606 reflects the typical option offered to the person answering, an answering machine or Voice Mail (VM). For both blocks 604 and 606 it should be understood that system 10 is configured to detect answering by telephony equipment as opposed to a person. Block 608 represents the situation where the notification is via fax to the customer. It should be understood that process 300 includes the personalization of the telefax transmission banner. Block 610 represents the situation where the notification is sent to a mobile telephone number which also detects whether the call is answered in person or by machine and takes appropriate action. In block 612, automated telephone equipment is contemplated. In this instance, system 10 is able to detect the situation and provide an extension number at the appropriate time. Block 612 also handles detects whether the call is answered in person or by machine and takes the action indicated. Block 614 represents the situation where a customer's pager is activated. In this instance, the main number and CN for process 300 is provided to the pager. One or more notification blocks 604, 606, 608, 610, 612, and 614 may be performed depending on the available numbers for the customer. Furthermore, it should be understood that system 10 is configured to perform notification without assistance one or more individuals, such as service associates or phone attendants. This feature significantly reduces customer communication costs for many types of service businesses—especially for communication intensive businesses such as automobile repair organizations.

Returning to FIGS. 5A and 5B, the control flow of interface 500 is further described. Control flows from stage 518 to menu loop 540 of FIG. 5B. On the other hand, if conditional 516 is not satisfied, control flows to conditional 520 to test whether key no. 3 has been pressed. Key number 3 is selected when the calling service associate wants to provide a message to the customer with the CN most recently entered in stage 501 without notification. The message is recorded in stage 522 if conditional 520 is satisfied; however, this selection does not provide notice to the customer. One possible use of this selection is to indicate routine service status with system 10 for access by the customer should the customer decide to call in through process interface 400. Next, control flows to menu loop 540 from stage 522.

If conditionals keys 1, 2, and 3 corresponding to conditionals 512, 516, 520 are not selected, then control goes to conditional 524 which tests whether key no. 4 has been pressed. Key no. 4 selection corresponds to a review of the customer interface 400 activity corresponding to the CN most recently entered in stage 501. If key no. 4 is pressed, stage 526 provides information such as a response recorded by a customer, notification status concerning a service associate message previously stored in stage 518, and the manner and propriety of any notices which have been sent under stage 518.

If conditional 524 has not been satisfied, then control flows to conditional 528 to determine is key no. 5 has been pressed. Key no. 5 corresponds to a verbal menu selection prompt for a CN maintenance menu. Although not shown to preserve clarity, the CN maintenance menu follows a verbal prompt/keypad selection system similar to the menu loops 320, 430, 440, and 510. Key no. 1 of the CN maintenance menu is selected to playback the current service associate message. Key no. 2 of the CN maintenance menu is selected to re-assign a CN to the currently active password. Key no. 3 is selected to add customer phones for the most recently entered CN in stage 501. Key no. 4 is selected to change customer phones for the most recently entered CN in stage 501. Key no. 5 is selected to re-record the customer's name corresponding to the most recently entered CN in stage 501.

Referring specifically to FIG. 5B, menu loop 540 is next described. Control flows from menu loop 510 to menu loop 540 when a service associate records a message in stage 518 or 522. Conditional 542 of loop 540 tests whether key no. 1 has been pressed. Selection of key no. 1 flags that the message recorded by the service associate does not require a response from the receiving customer in stage 544. This selection is typically made when the recorded message is one of interim status of the ongoing service and corresponds to a false conditional 412 (see FIG. 4A). If conditional 542 is not satisfied, control flows to conditional 546.

Conditional 546 tests whether key no. 2 has been pressed which is selected if a general response from the customer is needed. If conditional 546 is true, then the message recorded by the service associate is flagged for a general type of response. This situation corresponds to conditional 412 of interface 400 being true (see FIG. 4A). Similarly, Conditional 550 is encountered to test whether key no. 3 has been selected. Key no. 3 in menu loop 540 corresponds to a confirmation response by the customer that the message was received. The confirmation response is flagged in stage 552 when conditional 550 is true. If conditional 550 is false, control flows to conditional 554. In conditional 554, selection of key no. 4 is tested which corresponds to whether the recorded message in stage 518 or 522 should be flagged with an approval response. Stage 556 provides the approval response flag if conditional 554 is true. Otherwise, control flows back to conditional 542 via menu loop 540.

Menu loop 540 does not show an explicit termination; however, process 300 may be terminated by a service associate or customer at any point by hanging-up. Alternatively, one or more of stages 544, 548, 552, and 556 may be routed back to stage 501 of interface 500 to enter another CN (not shown). Moreover, the back-up key ("*" key) may be used to return to the previous option (not shown).

Besides providing a smart system to transfer messages between service associates and customers, system 10 may also be used to promote various aspects of the host business. For example, the host business may use the automated notification feature to broadcast various promotions to a number of customers using phone numbers from previously generated customer data records. These records can also be obtained from other means. Preferably, this feature would be an option under the management menu of FIG. 350. Furthermore, this feature can incorporate a response by customers. For example, the broadcast promotion may be an invitation to a car care clinic, and the solicited response functions as an RSVP.

In yet another embodiment of the present invention, the telefax capability of system 10 may be used to send messages into system 10 from a remote location as well. This feature may be used to distribute usage tips, or other information to service associates from a remotely located system 10 management site. For example, a centralized maintenance site may telefax training information to several business simultaneously which each utilize an embodiment of system 10.

As used herein, it should be appreciated that: variable, value, constant, flag, memory space, memory location, stage, process, conditional, a pressed or selected key of a keypad, menu selection, data record, code, or sound transmission each generally correspond to a "signal" within computer 30 of the present invention. Furthermore it should be be appreciated that these various signals are each generated or transmitted by computer 30 of the present invention.

It is contemplated that various operations, stages, conditionals, procedures, interfaces, menus, thresholds, and processes described in connection with the present invention could be altered, rearranged, substituted, deleted, duplicated, combined, or added to other processes as would occur to those skilled in the art without departing from the spirit of the present invention.

All publications and patent applications cited in this specification are herein incorporated by reference as if each individual publication or patent application were specifically and individually indicated to be incorporated by reference.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A method of communication, comprising:
   (a) servicing a number of devices at a business, each of the devices belonging to a different one of a number of customers, the customers delivering the devices to the business;
   (b) establishing a number of data records in a telephone message system, each of the records corresponding to one of the devices, the records each including a plurality of telephone numbers to contact a corresponding one of the customers; and
   (c) accessing a selected one of the records by entering a code through a telephone coupled to the system, the system providing a vocal menu with a number of different options each being selectable by entering a corresponding one of a number of different inputs through the telephone, one of the options being a recorded help dialog explaining other of the options.

2. The method of claim 1, further comprising transmitting a notification to a selected one of the customers in response to said accessing.

3. The method of claim 1, wherein the telephone includes a keypad and each of the inputs is entered by depressing keys of the keypad.

4. The method of claim 1, wherein the selected one of the data records includes a telephone number for contacting a selected one of the customers, and further comprising:
   telephoning the selected one of the customers with the system by accessing the telephone number;
   detecting an answer at the telephone number by an automated telephone message storage device; and
   storing a message on a device for the selected one of the customers.

5. The method of claim 1, wherein the plurality of telephone numbers for each of the records includes a home telephone number and a work telephone number for the corresponding one of the customers.

6. The method of claim 5, wherein the plurality of telephone numbers for at least one of the records further includes a mobile telephone number, a telefax machine telephone number, and a pager telephone number.

7. The method of claim 1, wherein each of the records corresponds to a different access code configured to provide selective access through the system.

8. A method of communication, comprising:
   (a) transporting a number of items to a business for servicing;
   (b) assigning each of the items at the business a unique code;
   (c) storing a voice message in a computer system for a customer corresponding to a selected one of the items by entering the code for the selected one of the items into the computer system through a telephone system, the message informing a customer that a recorded approval is required before servicing of the selected one of the items will be completed;
   (d) automatically telephoning the customer with the computer system to provide the message to the customer from the computer system, the computer system selecting at least one of a plurality of telephone numbers stored in the computer system for the customer to perform said telephoning; and
   (e) storing the recorded approval from the customer, in response to the message in the computer system.

9. The method of claim 8, wherein said response includes a vocal response from the customer and further comprising entering the access code corresponding to the selected one of the items to listen to the vocal response through the telephone system.

10. The method of claim 8, wherein the computer system is configured to provide a number of different operations each selected over the telephone system by a different entry with a telephone keypad, and the operations include a recorded help message explaining other of the operations.

11. The method of claim 8, further comprising detecting an answer to said telephoning by an automated telephone message storage device, and storing the message on the device.

12. A computer software apparatus configured with software for execution by a computer operatively coupled to a telephone system, comprising:

a computer readable medium encoded with a program having a plurality of instruction for the computer, said program being configured to generate a number of service records each corresponding to one of a number of devices being serviced by a business, said devices each belonging to one of a number of customers, said records each having a unique access code and a plurality of telephone numbers to contact a corresponding one of the customers and each being configured to correspond to a different voice message, said message being stored in response to entry of said access code through the telephone system for each of said records; said program being further configured to selectively send said message after storage through the telephone system to at least one of said plurality of telephone numbers for each of said records; said program providing a number of different vocal menu options over the telephone system, said options each being selectable by entering do different input through the telephone system, one of, said options including a help dialog explaining other of said options; and wherein said program is responsive to entry of said access code through the telephone system by a recipient of said message to store a response in the computer corresponding to said message fox each of said records.

13. The device of claim 12, wherein said medium includes a disk being at least partially made from a magnetic material and said program is electromagnetically encoded on said disk.

14. The method of claim 8, wherein the items are each an automobile.

15. The method claim 8, wherein the plurality of telephone numbers includes a home telephone number, a work telephone number, and a mobile telephone number.

16. The method of claim 1, wherein the devices are each an automobile.

17. A message management system for an automobile service business, comprising:

a telephone network accessible by a number of customers having an automobile being serviced at the business, said telephone network including a telephone accessible by a service attendant at the business;

a processor interfaced to said telephone network, said processor being programmed with:
  a first means for establishing a number of data records each including a plurality of telephone numbers and corresponding to one of the customers; and
  a second means for accessing a selected one of the records by entering a code through said telephone, said second means being configured to provide a vocal menu with a number of different options each being selectable by entering a corresponding one of a number of different inputs through said telephone, one of said options of said menu.

18. The system of claim 17, wherein said processor is further programmed with:
  a third means for storing a voice message for said one of the customers corresponding to said selected record by entering said code through said telephone network, said message informing said one of the customers that a recorded approval is required before servicing will be completed;
  a fourth means for automatically transmitting said message to said one of the customers through said telephone network; and
  a fifth means for storing said recorded approval from said one of the customers in response to said message after transmission through said telephone network.

* * * * *